(12) United States Patent
Voves

(10) Patent No.: US 7,063,579 B2
(45) Date of Patent: Jun. 20, 2006

(54) METHOD AND APPARATUS FOR RETRIEVING ENERGY FROM A FLOWING STREAM OF WATER

(76) Inventor: Joseph Voves, 18 Helena Dr., Chappaqua, NY (US) 10514

( * ) Notice: Subject to any disclaimer, the term of this patent is extended or adjusted under 35 U.S.C. 154(b) by 0 days.

(21) Appl. No.: 11/183,633

(22) Filed: Jul. 18, 2005

(65) Prior Publication Data
US 2006/0019553 A1 Jan. 26, 2006

Related U.S. Application Data

(60) Provisional application No. 60/590,147, filed on Jul. 22, 2004.

(51) Int. Cl.
*B63H 21/20* (2006.01)

(52) U.S. Cl. .............................. 440/3; 290/54
(58) Field of Classification Search ................... 440/3, 440/30; 290/42, 43, 53, 54, 55; 415/5, 7
See application file for complete search history.

(56) References Cited

U.S. PATENT DOCUMENTS

| | | |
|---|---|---|
| 904,892 A | 11/1908 | Pattosien |
| 3,882,320 A | 5/1975 | Schmeller |
| 3,922,012 A | 11/1975 | Herz |
| 3,986,787 A | 10/1976 | Mouton, Jr. et al. |
| 4,104,536 A | 8/1978 | Gutsfeld |
| 4,384,212 A | 5/1983 | Lapeyre |
| 4,412,417 A | 11/1983 | Dementhon |
| 4,443,708 A | 4/1984 | Lapeyre |
| 4,465,941 A | 8/1984 | Wilson et al. |
| 4,516,033 A * | 5/1985 | Olson .......................... 290/54 |
| 4,717,832 A | 1/1988 | Harris |
| 4,772,237 A * | 9/1988 | Zalkauskas .................. 440/30 |

FOREIGN PATENT DOCUMENTS

FR 2689184 10/1993

* cited by examiner

*Primary Examiner*—Lars A. Olson
(74) *Attorney, Agent, or Firm*—Milde & Hoffberg, LLP

(57) ABSTRACT

A boat for retrieving energy from a flowing stream of water, such as a river or tidal flow, which can be easily moved to a convenient location and which is capable of capturing a significant portion of the energy of the flowing stream. The boat has a bottom and two sides, forming an elongate hull with a bow and a stern at opposite ends, and means for anchoring the boat to hold it stationary in a stream of water. The boat has openable hinged members at the bow and stern to allow water to enter the interior of, and to flow through, the hull from one end to the other. Devices such as paddles are arranged inside the hull for converting energy of the water flowing through the hull into mechanical energy of a rotating shaft.

25 Claims, 4 Drawing Sheets

METHOD AND APPARATUS FOR RETRIEVING ENERGY FROM A FLOWING STREAM OF WATER

This appln claims benefit of 60/590,147, filed Jul. 22, 2004.

BACKGROUND OF THE INVENTION

The present invention relates to a method and apparatus for obtaining energy, particularly electrical energy, from a flowing stream such as a river, tidal basin or the like.

Many types of apparatus have been devised to convert the energy of a flowing stream of water into useable mechanical energy or electricity.

U.S. Pat. No. 904,892 to Pattosien discloses a "stream power electric float" which may be anchored in a stream so that the water flows beneath it. Two giant paddle wheels, mounted for rotation on the float, are driven by the flowing stream beneath the float. These paddle wheels are coupled by drive belts to an electric generator.

One advantage of this device is that it may be towed by a tugboat, motor boat or the like to a desired location, adjacent to where electrical power may be needed. A disadvantage is that the flowing stream may easily divert around, and thus bypass the paddles of the water wheels, limiting the amount of power that can be generated.

The U.S. Pat. No. 3,882,320 to Schmeller discloses a "tide energy conversion device" that comprises a stationary "channel", rigidly mounted on vertical piles driven into the ocean floor, to capture the ebb and flow of ocean tides. Energy from the flow of water through the channel is converted into mechanical energy by a plurality of paddles or blades arranged on an endless chain stretched between two sprocket wheels. As tide water flows through the channel it pushes the "blades" which move the chain and, in turn, rotate the sprocket wheels. A shaft connected to one set of sprocket wheels drives an electric generator.

An advantage of this device, over that of Pattosien, is that once water enters the channel, it cannot bypass the blades. However, the width of this channel is somewhat limited and, once fixed in place, the structure cannot be moved from one location to another.

Various other floating devices for generating electrical power from moving streams of water are disclosed in the U.S. Pat. No. 3,922,012 to Herz; U.S. Pat. No. 3,986,787 to Mouton, Jr. et al.; U.S. Pat. No. 4,104,536 to Gutsfeld and French Patent No. 2,689,184 to Garstka. While these devices have the advantage of being mobile, like the "electric float" of Pattosien, they are unable to convert a significant portion of the energy of a flowing stream into mechanical or electrical energy. This is because the water in the stream can elect to bypass the paddles, turbines or the like which convert the energy from one form to another.

Further devices for converting the energy of moving water into mechanical and/or electrical energy, are disclosed in the U.S. Pat. Nos. 4,384,212; 4,412,417; 4,443,708; 4,465,941 and 4,717,832. All of these devices are rigid structures, however, and are not designed to be moved from place to place.

SUMMARY OF THE INVENTION

It is a principal object of the present invention to provide a system, including both a method and apparatus, for retrieving energy from a flowing stream of water, such as a river or tidal flow, which can be easily moved to a convenient location and which is capable of capturing a significant portion of the energy of the flowing stream.

This object, as well as other objects which will become apparent from the discussion that follows, are achieved, in accordance with the present invention, by providing a boat, having a bottom and two sides forming an elongate hull with a bow and a stern at opposite ends; and means for anchoring the boat to hold it stationary in a stream of water. According to the invention, the boat has openable hinged members at the bow and stern to allow water to enter the interior of, and to flow through, the hull from one end to the other (either from bow to stern or from stern to bow). Devices such as paddles, turbines, screws or the like are arranged inside the hull for converting energy of the water flowing through the hull into mechanical energy of a rotating shaft.

The method according to the present invention comprises the steps of moving the boat to a desired position in the stream of water, anchoring the boat to hold it stationary in the stream, opening the hull at its bow and stern to allow water to flow through it and converting energy of the flowing water into mechanical energy. The boat may be moved to the desired location either by towing it, with a tugboat or the like, or by means of its own source of propulsion, such as one or more outboard motors.

Preferably, the energy of the flowing water is converted into mechanical energy by means of a plurality of movable paddles which intercept all of the water flowing through the hull. In this way, once water enters the hull, nearly all of its energy can be converted into mechanical energy; that is, the energy of a rotating shaft. By conforming the size and shape of the paddles to that of the hull, water is prevented from diverting around, and bypassing the paddles as it flows through the hull.

In accordance with a particular, advantageous embodiment of the invention, the bow of the boat includes two upright hinged members, arranged in an inverted V configuration, forming a "prow" when in a closed position. These hinged members are each openable sideways about a substantially vertical hinge line on a leading edge of each side of the hull of the boat. With this arrangement, the hinged members of the bow may be opened into a V configuration, thereby forming a "funnel" to channel the water in the stream through the hull.

In contrast, the stern may include a single, flat, upright hinged member arranged between the two sides of the hull when in the closed position. This hinged member is openable downward about a substantially horizontal hinge line at a trailing edge of the bottom of the boat to allow water to exit the hull.

Following its operation in one location, when the boat is to be moved to a new location, the hinged members at the bow of the boat are first closed, preventing new water from entering the hull. The hull is then emptied of water by moving the paddles and causing the water to exit through the stern. Thereafter, the hinged member at the stern is closed and the remaining water in the hull is removed (if desired) by means of a pump. Once emptied of water, the hull may be easily moved.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
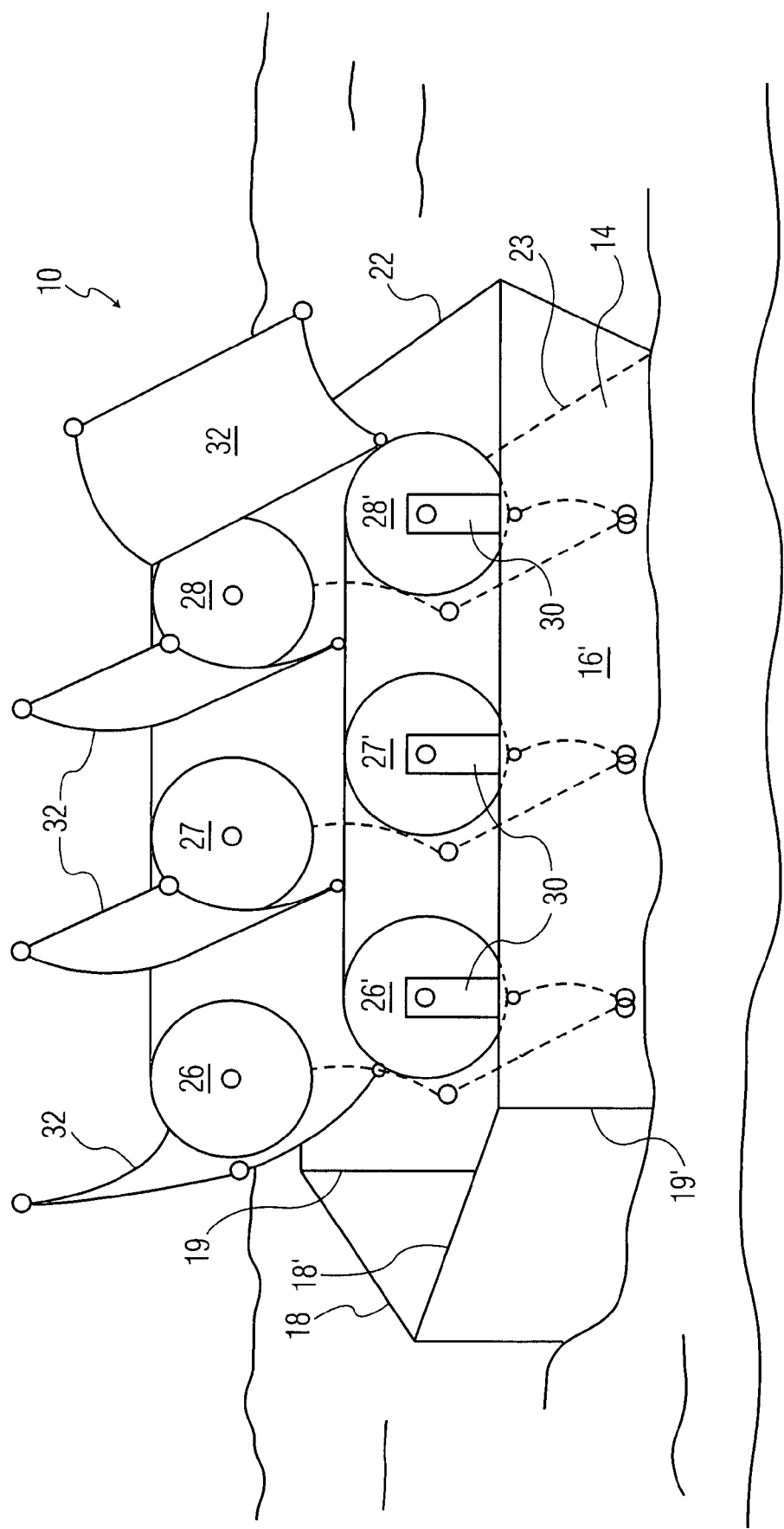
FIG. 1 is a perspective view of the mobile apparatus, according to the invention, for retrieving energy from a flowing stream of water.

The preferred embodiments of the present invention will now be described with reference to FIGS. 1–6 of the drawings. Identical elements in the various figures are designated with the same reference numerals.

Figure 2:
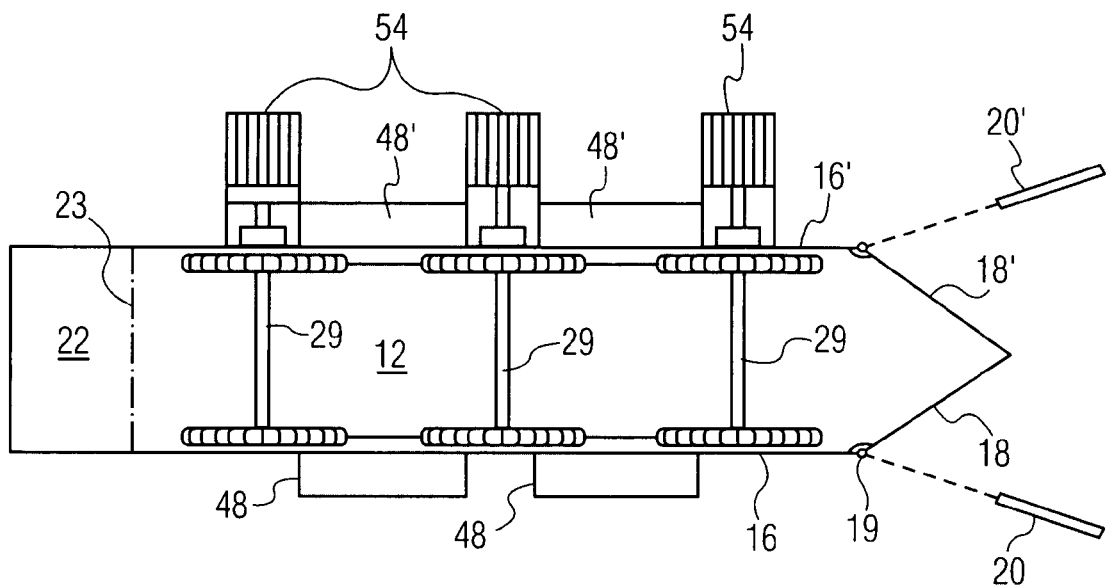
FIG. 2 is a top view of the apparatus of FIG. 1.
Figure 3:
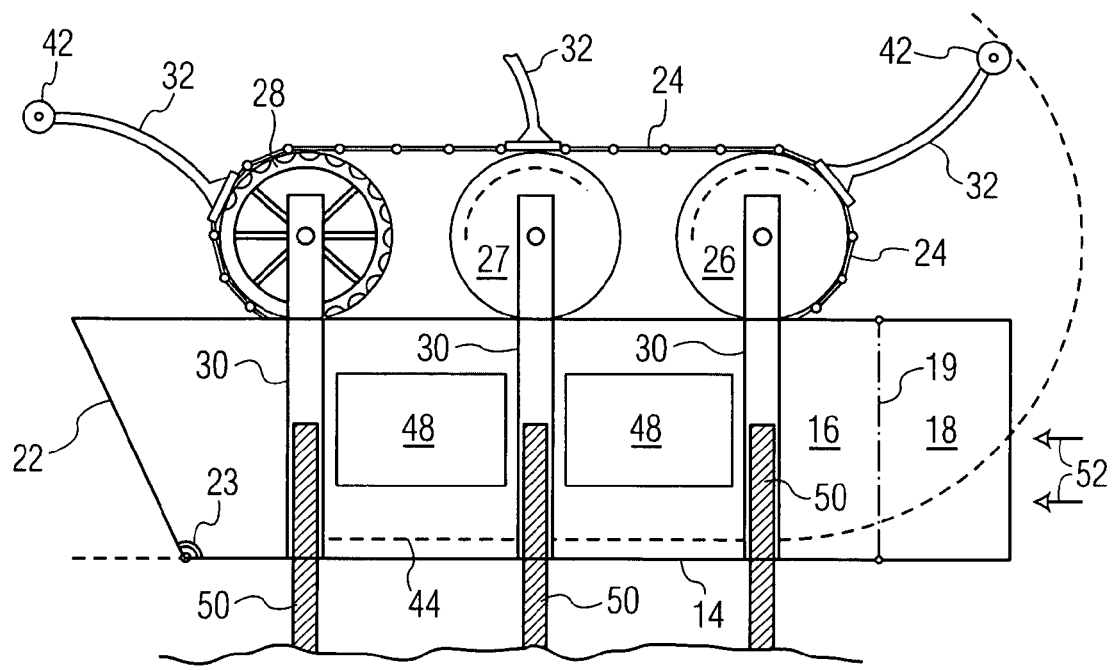
FIG. 3 is a side view of the apparatus of FIG. 1.

The preferred embodiment of the mobile apparatus for retrieving energy from a flowing stream of water is illustrated in FIGS. 1–3 of the drawings. As is shown there, the apparatus comprises a boat 10 having an elongate hull 12 formed by a flat, horizontal bottom 14 and two upright, flat sides 16 and 16' on starboard and port, respectively. The bow or prow of the boat is formed by two upright flat members 18, 18' arranged in an inverted (upside down) V configuration. These members are hinged to the sides of the hull 16, 16', respectively, about substantially vertical hinge lines 19, 19', respectively. The hinged members 18, 18' are sealed together at the prow and sealed to the bottom 14 of the boat when they are in a closed position. During operation, these members may be swung open on their hinges, moved either by hand or automatically using a mechanical or hydraulic mechanism, so that they extend outward from the hull in an open V configuration, as illustrated in FIG. 2. In this way, the hinged members 18, 18' form a funnel to channel water through the hull.

Advantageously, the hinged members 18, 18' include plates 20, 20', respectively, which are extendible, also as shown in FIG. 2, to increase the width of the opening of the funnel.

The stern of the boat is enclosed by a single, flat upright member 22 extending at an approximately 30° angle between the two sides 16, 16'. This member is openable downward about a substantially horizontal hinge line 23 at the trailing edge of the bottom of the boat.

When both the front hinged members 18, 18' and the rear hinged member 22 are open, water can flow through the channel formed by the sides 16, 16' and bottom 14 of the hull. As noted above, the amount of water in this channel may be increased by opening the front hinged members 18, 18' into a V configuration and extending the length of these members by means of extension plates 20, 20', respectively, A significant portion of the energy of the water flowing through the hull channel may be captured and converted into mechanical energy by means of a plurality of paddles which extend downward into the channel. These paddles may be arranged on a single paddle wheel (not shown) arranged at substantially the center of the boat or, as shown in FIGS. 1 and 3, they may be mounted on two endless chains 24, 24' located just inside the lateral sides of the boat to starboard and port, respectively. The chains are positioned and tensioned by sprocket wheels 26, 27, 28 on the starboard side, and 26', 27', 28' on the port side, of the boat. Although three sprocket wheels on each side are illustrated, the chains may operate with only two sprockets on each side, or with more than three. The sprocket wheels are mounted for rotation, driving horizontal axle shafts 29, on upright members 30 attached to the respective sides of the hull. Each of the axle shafts drives a separate electric generator 54 through a suitable mechanical coupling and transmission.

Figure 5A:
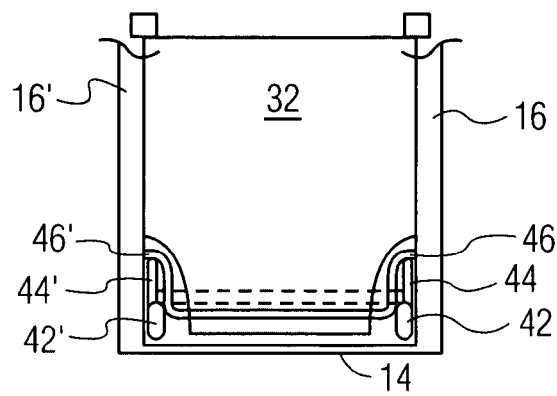
FIGS. 5A and 5B are a face view and side view, respectively, of a paddle which is used in the apparatus of FIGS. 1–3.
Figure 5B:
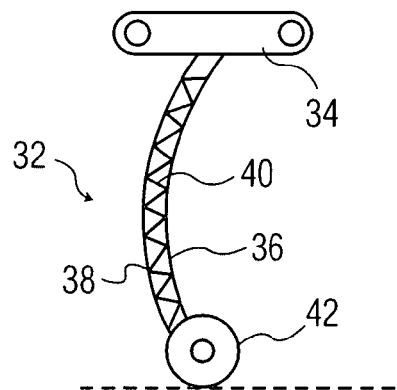

Paddles 32 are rigidly coupled to individual links 34 of the chains 24, 24'. These paddles, which are shown in greater detail in FIGS. 5A and 5B, are preferably formed of front sheet 36, a rear sheet 38 and an intermediate structure, made of lightweight plastic or the like, so that this relatively large member is light in weight.

The paddles are preferably substantially spoon shaped with their concave sides facing the incoming flow of water. They are designed and sized to fill the entire cross-sectional area of the channel formed by the hull of the boat. At their outer extremities, the paddles are provided with rollers 42, 42' which are received in corresponding grooves in the hull 44, 44' as they are moved along from front to back insuring that the paddles, as they move, are constrained to a position transverse to the direction of water flow. The rollers 42, 42' are retained in the grooves 44, 44' by protruding lips 46, 46', respectively.

Figure 6A:
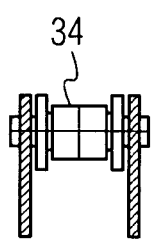
FIGS. 6A and 6B are an end view and side view, respectively, of a link in the chain which is used in the apparatus of FIGS. 1–3.
Figure 6B:
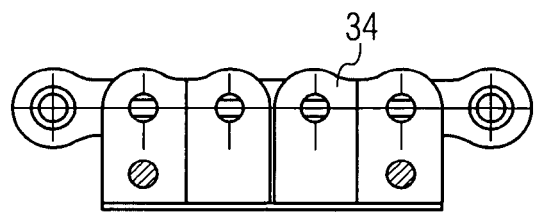

As noted above, the paddles are rigidly attached to links 34 in the chain 24. A typical link is shown in FIGS. 6A and 6B.

The boat may be lowered into, and raised upward in, the water by filling and emptying water tanks or "floating chambers" 48, 48' mounted on each side of the hull. Water pumps (not shown) are provided for filling and emptying each tank, similar in operation to that of a submarine.

The boat may be held in place in a stream of water by means of cables or chains attached to stays on the side of the steam or to a buoy anchored to the bottom of the stream. Preferably, however, especially when the water is relatively shallow, the boat is held stationary by means of vertical rods 50 arranged on each side of the hull which are extendible downward, either by mechanical or hydraulic means, to support the hull from the ground beneath the stream of water. When the boat is to be moved, the rods 50 are raised upward so that their lower-most ends are even with the bottom 14 of the hull.

Finally, as shown in FIG. 2, as the sprockets 26, 27, 28 and 26', 27', 28' are rotated by the chains 24, 24' due to the force of the water that acts on the paddle 32 as the water flows through the hull in the direction shown by the arrows 52, the sprockets rotate their corresponding shafts 29 which, in turn, act on the corresponding generators 54. Since the rotational speed of the sprockets and their shaft 29 is relatively low, this speed is increased by an intermediate gear set, such as a planetary transmission, between each shaft and its corresponding generator.

The operation of the energy conversion system according to the invention will now be described with reference to FIGS. 4A–4D of the drawings.

Figure 4A:
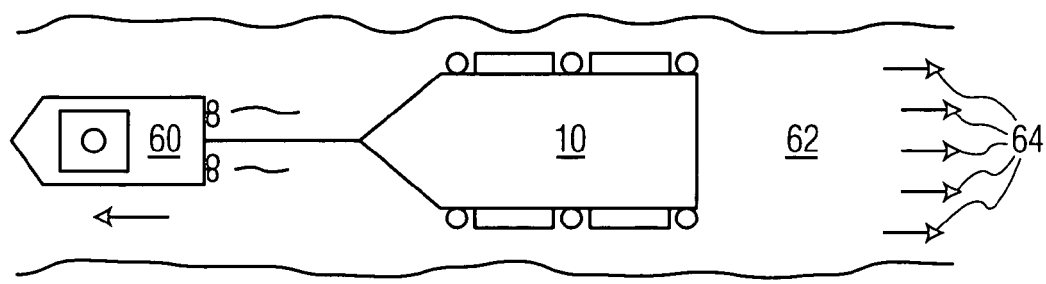
FIGS. 4A–4D are successive, representational diagrams illustrating the method of operation of the apparatus of FIGS. 1–3.

FIG. 4A shows a tugboat 60 pulling the mobile apparatus 10 according to the invention upstream in a river 62 having a water flow profile, from one bank to the other, as shown by the arrows 64.

Figure 4B:
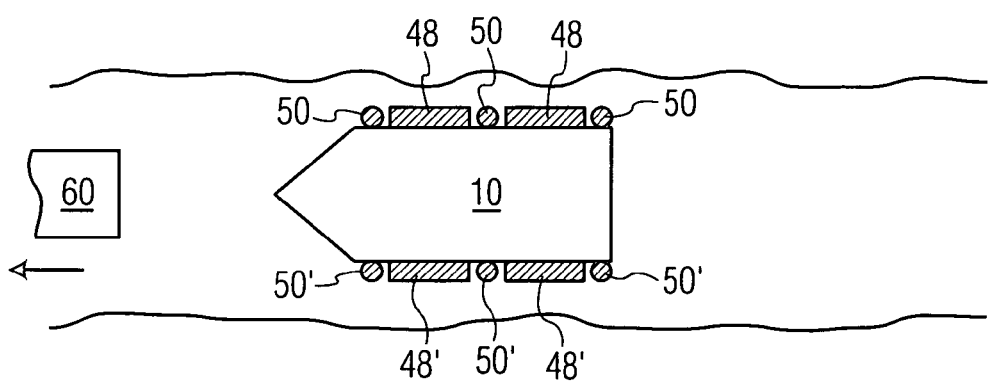

After reaching a desired location, which may be next to a town, a bridge construction site, or the like, the apparatus (boat) 10 is caused to descend deeper into the water by filling the side mounted chambers 48, 48', as indicated by the darkened areas in FIG. 4B, and the boat is anchored to the bottom of the stream by driving downward the anchor rods 50, 50'. Once in this position, the tugboat 60 is disconnected and moved away.

Figure 4C:
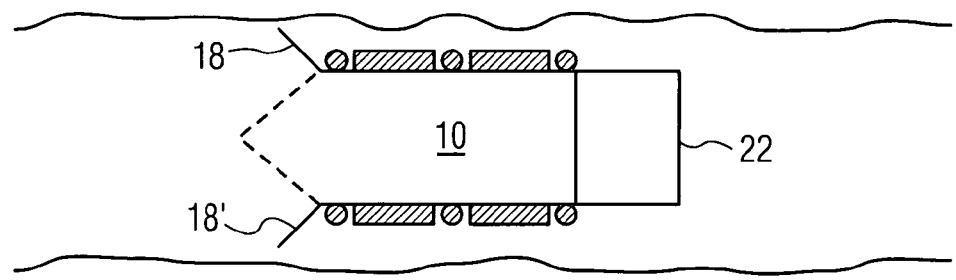

Thereafter, a valve is opened to allow water from the stream to enter the hull of the boat. When the water level within the hull is the same as that of the rest of the stream, the hinged members 18, 18' at the bow and the hinged member 22 are opened to allow water to flow through the hull, as shown in FIG. 4C. By adjusting the opening angle, as well as the extensions 20, 20' of the hinged members 18, 18', it is possible to divert nearly all of the water that flows in the stream through the hull of the boat 10. This water then acts on the paddles 32 to drive the electric generators.

Figure 4D:
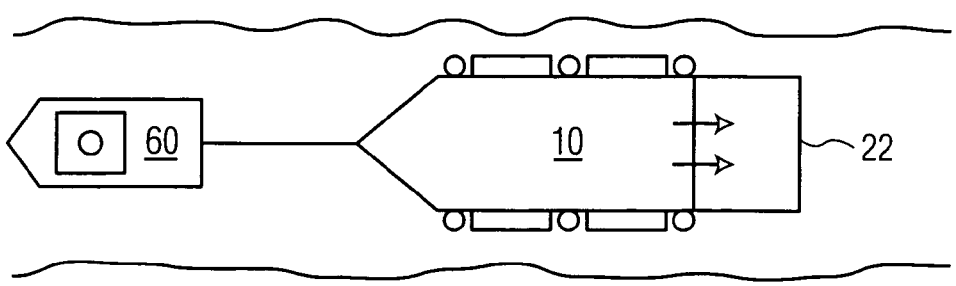

When it is desired to take the apparatus out of service, the hinged members 18, 18' at the bow of the boat are closed and a tugboat 60 is again connected to the front of the boat, as shown in FIG. 4D. Thereafter, the rods 50, 50' are raised up and water is pumped from the tanks 48, 48' to allow the boat to float. In order to empty the boat, the electric generators are operated briefly as electric motors to drive the sprockets 26, 27, 28 and 26', 27', 28', thus move the paddles 32 in the same direction as they were moved by the flow of water. This action "sweeps" the water out of the hull towards the stern. When the hull is substantially empty, the stern member 22 is raised up and closed to seal the hull. If desired, the remaining water may be pumped out of the hull so that the boat 10 is relatively light and may be easily moved to another location.

There has thus been shown and described a novel method and apparatus for retrieving energy from a flowing stream of water which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A mobile apparatus for retrieving energy from a flowing stream of water, said apparatus comprising, in combination:
    (a) a boat having a bottom and two sides forming an elongate hull with a bow and a stern at opposite ends, said bow and stern each including at least one hinged member, said hinged members being openable to allow water to enter the interior of, and to flow through, the hull from one of said ends to the other;
    (b) means for anchoring the boat to hold it stationary in a stream of water; and
    (c) means arranged inside the hull for converting a portion of the energy of water flowing through the hull into mechanical energy of a rotating shaft.

2. The apparatus defined in claim 1, wherein said bow includes two upright hinged members, arranged in an inverted V configuration, forming a prow of the boat when in a closed position, and wherein said two hinged members are each openable sideways about a substantially vertical hinge line on a leading edge of a respective one of said sides to allow water to flow through the hull.

3. The apparatus defined in claim 2, wherein said two hinged members of said bow are openable into a V configuration, thereby to form a funnel to channel water through the hull.

4. The apparatus defined in claim 1, wherein said stern includes a single upright hinged member arranged between said two sides when in the closed position, and openable downward about a substantially horizontal hinge line at a trailing edge of the bottom of the boat to allow water to flow through the hull.

5. The apparatus defined in claim 1, wherein said means for anchoring the boat includes at least one substantially vertical rod arranged on each side of the hull and means for driving each said rod vertically downward to support the hull from ground beneath the stream of water, and vertically upward to release the hull and allow the boat to move in said stream.

6. The apparatus defined in claim 1, further comprising at least one water tank arranged on each side of the hull and means for causing each tank to be filled with water to lower the hull in the stream of water, and for emptying each tank to cause the hull to float even while water flows through it.

7. The apparatus defined in claim 1, wherein said energy converting means includes a plurality of movable paddles arranged in the hull substantially transversely to the direction of flow of water through the hull, and means for converting motion of the paddles into rotary motion.

8. The apparatus defined in claim 7, wherein said paddles are disposed on a paddle wheel arranged for rotation about an axis transverse to said direction of flow of water.

9. The apparatus defined in claim 7, wherein said paddles are disposed on at least one chain having a portion which extends substantially linearly in said direction of flow of water, whereby said chain causes said paddles to move substantially linearly through said hull due to the flow of water.

10. The apparatus defined in claim 7, wherein said paddles extend from said chain at a substantially 90 degree angle with respect to the direction of said linear portion thereof.

11. The apparatus defined in claim 9, wherein said chain forms an endless loop that extends around two sprockets, one sprocket adjacent the bow and the other adjacent the stern of the boat, whereby the paddles are lifted out of one end of the hull and moved back to be inserted into the hull again at the opposite end.

12. The apparatus defined in claim 7, wherein said paddles are substantially spoon shaped with their concave sides facing the incoming flow of water.

13. The apparatus defined in claim 7, wherein said paddles are each formed of two sides with a hollow interior to reduce their weight.

14. The apparatus defined in claim 7, wherein said paddles each have at least one roller rotatably mounted at an outer edge thereof, and wherein said hull includes at least one groove for receiving the paddle rollers and thereby retaining the paddles in a position transverse to the direction of water flow.

15. The apparatus defined in claim 1, wherein said bottom of said hull is substantially flat from one of said sides to the other, and from said bow to said stern.

16. The apparatus defined in claim 1, further comprising an electric generator mechanically coupled to said shaft.

17. A method of retrieving energy from a flowing stream of water, said method comprising the steps of:
    (a) moving a floating boat to a selected position in the stream of water, said boat comprising a hull formed by a bottom and two sides and having a bow and a stern at opposite ends thereof;
    (b) anchoring the hull of said boat to hold it stationary in the stream of water;

(c) opening the hull at its bow and stern to allow water to flow through the hull; and (d) converting at least a portion of the energy of the water flowing through the hull into mechanical energy of a rotating shaft.

18. The method defined in claim 17, wherein said moving step includes the step of towing said boat to said selected position.

19. The method defined in claim 17, wherein said opening step includes the step of moving at least one bow member and at least one stern member away from the sides of the hull to allow water to enter and flow through the hull.

20. The method defined in claim 17, wherein said converting step includes the step of placing a plurality of movable paddles in the path of the flow of water, said paddles being coupled to said shaft to cause said shaft to rotate when the paddles are moved by the flow of water.

21. The method defined in claim 20, wherein an electric generator is mechanically coupled for rotation with said shaft.

22. The method defined in claim 17, further comprising the step of lowering the hull in the water prior to anchoring it.

23. The method defined in claim 17, further comprising the steps of closing the end of the hull facing in the direction of incoming water flow, emptying water from the hull at the opposite end, and thereafter closing said opposite end.

24. The method defined in claim 23, wherein said emptying step includes the step of placing a plurality of movable paddles in the path of the flow of water, and moving said paddles in the direction of flow to cause water to pass out of said opposite end.

25. The method defined in claim 23, further comprising the step of moving said boat to another location after closing said opposite end.

* * * * *